United States Patent
Allansson

(10) Patent No.: US 6,353,525 B1
(45) Date of Patent: Mar. 5, 2002

(54) ARRANGEMENT IN A POWER UNIT FOR A GRID-PULSED, O-TYPE MICROWAVE TUBE

(75) Inventor: Jan Allansson, Asa (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/522,402

(22) Filed: Mar. 9, 2000

(30) Foreign Application Priority Data

Mar. 9, 1999 (SE) ................................................. 900837

(51) Int. Cl.⁷ ............................. H01P 5/08; H03F 5/38
(52) U.S. Cl. ....................................... 361/113; 330/43
(58) Field of Search ............................. 361/113; 315/9, 315/3.5, 225, 337

(56) References Cited

U.S. PATENT DOCUMENTS

| | | | |
|---|---|---|---|
| 3,569,854 A | 3/1971 | Boyd | 331/82 |
| 4,021,758 A * | 5/1977 | Standing | 332/105 |
| 4,101,804 A * | 7/1978 | Carlsson | 315/3.5 |
| 4,323,853 A * | 4/1982 | Kurokawa | 315/3.5 |
| 4,682,369 A * | 7/1987 | Schrader | 315/105 |
| 4,994,954 A * | 2/1991 | Katz et al. | 363/89 |
| 5,170,112 A * | 12/1992 | van der Mark | 323/338 |
| 5,453,746 A | 9/1995 | Morand | 342/14 |
| 5,568,014 A | 10/1996 | Aoki et al. | 315/3.5 |
| 5,708,356 A * | 1/1998 | Onodera | 323/275 |
| 5,764,003 A * | 6/1998 | Boone | 315/9 |

* cited by examiner

Primary Examiner—Peter S. Wong
Assistant Examiner—Pia Tibbits
(74) Attorney, Agent, or Firm—Nixon & Vanderhye P.C.

(57) ABSTRACT

A power unit for a grid pulsed O-type microwave tube (1) having a cathode (2) and a collector (3), comprises a cathode unit (5) and a collector unit (6), each having two output terminals (7, 8; 9, 10). A first and a second capacitor (C1, C2) are connected between the output terminals of the respective unit (5, 6). One output terminal (7) of the cathode unit (5) is connected to the cathode (2) of the tube (1), while the other (8) is connected to a ground terminal. One output terminal (9) of the collector unit (6) is connected to the collector (3) of the tube (1), while the other (10) is interconnected with that one (7) of the output terminals of the cathode unit (5) that is connected to the cathode (2) of the tube (1). To minimize crosstalk caused by the collector unit (6) across the first capacitor (C1), the output terminals (9, 10) of the collector unit (6) are connected to said second capacitor (C2) via non-capacitive impedances (Z1, Z2), and to said ground terminal via decoupling capacitors (C31, C32).

3 Claims, 1 Drawing Sheet

ARRANGEMENT IN A POWER UNIT FOR A GRID-PULSED, O-TYPE MICROWAVE TUBE

TECHNICAL FIELD

The invention relates generally to power units and more specifically to an arrangement in a power unit for a grid pulsed O-type microwave tube.

BACKGROUND OF THE INVENTION

In high-power radar transmitters, high-voltage power units are used to power grid-pulsed, O-type microwave tubes, e.g., travelling-wave tubes. Such tubes have a cathode and at least one collector, and a power unit for such tubes comprises a cathode power unit and a collector power unit for each collector.

The cathode power unit has two output terminals. One of the output terminals is to be connected to the cathode of the microwave tube, while the other output terminal is connected to a ground terminal. Between the output terminals of the cathode power unit, a capacitor is connected.

The collector power unit also has two output terminals. One of these output terminals is to be connected to the collector of the microwave tube, while the other output terminal is interconnected with that one of the output terminals of the cathode power unit that is to be connected to the cathode of the microwave tube. Between the output terminals of the collector power unit, a capacitor is also connected.

Both the cathode power unit and the collector power unit normally comprise converters, high-voltage transformers, rectifiers and filters.

For good performance of the microwave tube, a high quality cathode voltage is required.

However, in such power units, there are problems with crosstalk from the collector power unit to the cathode voltage. When the capacitor connected between the output terminals of the collector power unit is recharged by the collector power unit, an undesired current appears through the capacitor connected between the output terminal of the cathode power unit due to undesired stray capacitances between the collector power unit and ground, mainly between the high-voltage transformer in the collector power unit and ground.

This undesired current results in undesired cathode voltage variations.

SUMMARY OF THE INVENTION

An object of the invention is to eliminate crosstalk from the collector power unit to the cathode voltage. This is attained in accordance with the invention by connecting the output terminals of the collector power unit to the associated capacitor via non-capacitive impedances as well as to the ground terminal via decoupling capacitors. As a result, crosstalk caused by the collector power unit across the output terminals of the cathode power unit is eliminated.

This is attained in accordance with the invention by connecting the output terminals of the collector power unit to the associated capacitor via non-capacitive impedances as well as to said ground terminal via decoupling capacitors.

Hereby, crosstalk caused by the collector power unit across the output terminals of the cathode power unit will be eliminated.

BRIEF DESCRIPTION OF THE DRAWING

The invention will be described more in detail below with reference to the appended drawing on which

DESCRIPTION OF THE INVENTION

Figure 1:
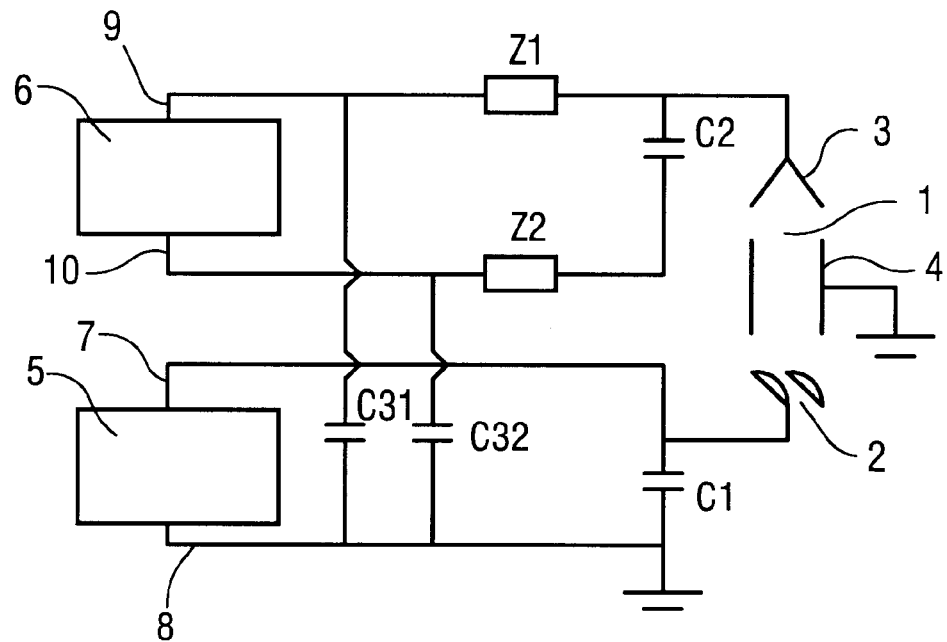
FIG. 1 illustrates an embodiment of an arrangement according to the invention in a power unit for a travelling-wave tube.

FIG. 1 shows an embodiment of an arrangement according to the invention in a power unit for a travelling-wave tube generally denoted 1. It is however to be understood that the invention is applicable to power units for any so called grid-pulsed, O-type microwave tube, e.g., a klystron. The tube 1 comprises a cathode 2, a collector 3, and an anode 4 (sometimes known as a slow wave structure) that is connected to ground. In a manner known per se, the power unit for the tube 1 comprises a cathode power unit 5 and a collector power unit 6. Also in a manner known per se, the cathode power unit 5 and the collector power unit 6 both comprise a converter, a transformer, a rectifier, and capacitors (not shown).

The cathode power unit has two output terminals 7 and 8. The output terminal 7 is connected to the cathode 2 as well as to one terminal of a capacitor C1, while the output terminal 8 is connected to the other terminal of the capacitor C1 as well as to a ground terminal.

In a similar manner, the collector power unit has two output terminals 9 and 10. The output terminal 9 is connected to the collector 3 of the tube 1 as well as to one terminal of a capacitor C2, while the output terminal 10 is connected to the other terminal of the capacitor C2 as well as to the interconnection point between the output terminal 7 of the cathode power unit 5, the cathode 2, and said one terminal of the capacitor C1.

In accordance with the invention, to reduce the effect on the voltage across the capacitor C1 by undesired currents through the capacitor C1, the output terminals 9 and 10 of the collector power unit 6 are connected to the respective terminal of the capacitor C2 via respective impedances Z1, Z2. These impedances Z1, Z2 comprise only resistors and/or inductors, i.e. the impedances Z1, Z2 are non-capacitive impedances. The values of the impedances Z1, Z2 are adapted to the impedance of the capacitor C2, and can be of equal impedance values.

Also, the output terminals 9 and 10 of the collector power unit 6 are connected to the ground terminal via respective decoupling capacitors C31, C32. The capacitance values of the capacitors C31, C32 are adapted to the capacitance to ground of the output terminals 9, 10 of the collector power unit 6, and can be of equal capacitance values.

Figure 2:
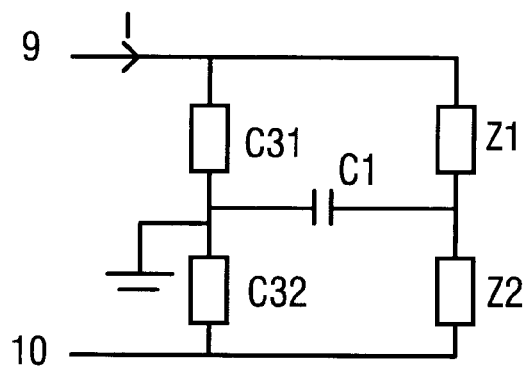
FIG. 2 illustrates an equivalent circuit diagram of the arrangement in FIG. 1.

To illustrate the effect of the collector power unit 6 on the cathode voltage across the capacitor C1, reference is made to FIG. 2 which illustrates an equivalent circuit diagram of the arrangement according to the invention. In FIG. 2, the effect of the cathode power unit on the cathode voltage is disregarded. Also, the impedance of the capacitor C2 is disregarded since it is much smaller than the impedances Z1, Z2.

As apparent from FIG. 2 a recharging current I from the output terminal 9 of the collector power unit 6 will not give rise to any current through the capacitor C1, and consequently no crosstalk will appear.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Accordingly, it is intended that the invention be limited only by the scope of the claims appended hereto.

What is claimed is:

1. An arrangement in a power unit for a grid-pulsed, O-type microwave tube, comprising:
   a cathode;
   a collector;
   a cathode power unit having first and second cathode power unit output terminals coupled to the cathode, the second cathode power unit output terminal also being coupled to a ground terminal;
   a first capacitor coupled between the first and second cathode power unit output terminals;
   a collector power unit having first and second collector power unit output terminals coupled to the collector, the second collector power unit output terminal being coupled to the first cathode power unit output terminal;
   a second capacitor coupled between the first and second collector power unit output terminals;
   first and second non-capacitive impedances adapted to the impedance of the second capacitor and coupled, respectively, between the first and second collector power unit output terminals and the second capacitor; and
   first and second decoupling capacitors, adapted to the capacitance to ground of the first and second collector power unit output terminals, respectively, coupled from a point between the first and second collector power unit output terminals and the first and second non-capacitive impedances, respectively, and the ground terminal,
   wherein the coupling of the first and second collector power unit output terminals to the first and second non-capacitive impedances, respectively, reduces crosstalk caused by the collector power unit across the first capacitor.

2. The arrangement as claimed in claim 1, wherein the non-capacitive impedances have the same impedance value.

3. The arrangement as claimed in claim 1, wherein the decoupling capacitors have the same capacitance value.

* * * * *